United States Patent
Tsay et al.

(10) Patent No.: US 6,529,237 B1
(45) Date of Patent: Mar. 4, 2003

(54) COMPLETE CDS/PGA SAMPLE AND HOLD AMPLIFIER

(75) Inventors: Ching-yuh Tsay, Plano, TX (US); Arash Loloee, Plano, TX (US); Eric G. Soenen, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/189,237

(22) Filed: Nov. 10, 1998

Related U.S. Application Data
(60) Provisional application No. 60/067,230, filed on Dec. 2, 1997.

(51) Int. Cl.[7] .......................... H04N 5/217; H04N 9/64; H04N 5/335; H04N 5/08
(52) U.S. Cl. ...................... 348/241; 348/243; 348/308; 348/533
(58) Field of Search ................................ 348/241, 243, 348/250, 308, 533; 250/208.1; 257/291, 292, 293; 330/9

(56) References Cited

U.S. PATENT DOCUMENTS

| | | | | |
|---|---|---|---|---|
| 5,724,095 A | * | 3/1998 | Shyu et al. | 348/241 |
| 6,018,364 A | * | 1/2000 | Mangelsdorf | 348/241 |
| 6,166,766 A | * | 12/2000 | Moore et al. | 348/241 |
| 6,201,572 B1 | * | 3/2001 | Chou | 348/241 |
| 6,346,968 B1 | * | 2/2002 | Domer et al. | 348/222 |

OTHER PUBLICATIONS

Matsumoto et al. A CMOS fron–end for CCD cameras, IEEE, pp. 186–187, 1996.*
Hyabg et al., Reduced nonlinear distortion in circuits with correlated double sampling, IEEE, pp. 159–162, 1996.*
Wang et al., Capacitive ration testing and sensor readout, IEEE, pp. 1169–1172, May 19–21, 1997.*

* cited by examiner

*Primary Examiner*—Wendy R. Garber
*Assistant Examiner*—Lin Ye
(74) *Attorney, Agent, or Firm*—Alan K. Stewart; W. James Brady, III; Frederick J. Telecky, Jr.

(57) ABSTRACT

A correlated double sampled/programmable gain amplifier (CDS/PGA) is disclosed which is operable to precondition a CCD output analog signal. The CDS/PGA includes an operational amplifier that is configured in a sample hold operation. The single-ended input is first clamped by a switch (34) to clamp the DC level therein for a given pixel. A switch (38) then samples the reset level onto a sampling capacitor (46), and a switch (42) thereafter samples the video signal onto one plate of a capacitor (50). The lower plates of the capacitors (46) and (50) are then equalized and the other plates thereof connected to the positive and negative inputs of the operational amplifier (68). An offset is provided by a programmable DAC (26) to account for the dark current offset. The output scale is adjusted or mapped by limiting the output between a negative and a positive reference input. The sampling capacitors (46) and (50) can be varied to vary the gain of the amplifier.

14 Claims, 5 Drawing Sheets

FIG. 7

COMPLETE CDS/PGA SAMPLE AND HOLD AMPLIFIER

This application claims priority under 35 USC § 119 (e)(1) of provisional application No. 60/067,230, filed Dec. 2, 1997.

TECHNICAL FIELD OF THE INVENTION

The present invention pertains in general to a front end sample and hold and signal conditioning circuit for processing a CCD signal prior to converting it to a digital format and, more particularly, to a signal conditioning circuit that provides a number of integrated functions such as correlated double sampling (CDS) and programmable gain.

BACKGROUND OF THE INVENTION

Charge coupled devices (CCD) have been utilized in a number of image generators such as video cameras and optical scanners. The signal typically output by such devices is an analog signal, which is then processed, typically in the digital domain. These analog signals are typically input to some type of analog-to-digital conversion device, which will then perform the necessary processing thereon. However, prior to input of the analog signal to the A/D converter, it typically must have some type of signal conditioning performed thereon.

For a circuit processing AC coupled CCD signals, some type of sample and hold and signal conditioning circuit is required. One requirement is to perform some type of sampling operation, such as a correlated double sampling (CDS) to enhance signal-to-noise ratio of the CCD signals. Further, this could be a simple sample and hold function. Since it is an AC coupled system, there is a DC level for the input signal that is unknown. The signal conditioning circuit must somehow determine this DC signal. Further, dynamic range will be enhanced with some type of programmable gain. Another requirement for a front end is to provide some type of DC offset that will eliminate what is referred to as "dark current," which is the difference between an output signal with no level, i.e., representing dark, and the actual perceived signal. If there is an offset, this will not provide a true dark signal. Some type of offset calibration is required to accommodate this adjustment.

SUMMARY OF THE INVENTION

The present invention disclosed and claimed herein comprises a preconditioning circuit for preconditioning an analog CCD output signal representing the output of a plurality of pixels, with each pixel having associated therewith a DC reference level and a video level. An amplifier is provided with an associated gain which has associated therewith a sampling network. The sampling network is operable to sample a CCD output signal onto the input of the amplifier to provide a sampled analog output signal from the amplifier. An offset network is provided for generating a predetermined analog offset signal level and then offsetting the sampled input signal to the input of the amplifier by the predetermined analog offset signal level. This offset operation will remove any error due to both dark current errors in the CCD output signal and any offset errors in the amplifier.

In another aspect of the present invention, the sampling network operates in accordance with a correlated double sampling algorithm. The sampling network is operable to receive a single ended input in the form of a CCD output signal and then convert it to a double ended output from the amplifier. Two input sampling capacitors are provided for sampling the input signal onto one of two differential inputs with the amplifier being a differential amplifier. The DC reference level is sampled onto the first sampling capacitor during the generation thereof and, at a later time, the video signal level is sampled onto the second sampling capacitor. By equalizing the plates of the capacitors opposite to the positive and negative inputs of the amplifier, a differential input signal is provided on the differential input to the amplifier.

In a further aspect of the present invention, a clamping circuit is provided for clamping the CCD output signal to a known DC clamp voltage during the time the DC reference level is generated. This allows the DC reference level sampled onto the first sampling capacitor to be a known DC reference level for each pixel.

In an even further aspect of the present invention, feedback capacitors are provided which, in conjunction with the sampling capacitors, define the gain of the amplifier. Each of the sampling capacitors has associated therewith a trimming network for varying the overall effective capacitance of the input sampling capacitor.

BRIEF DESCRIPTION OF THE DRAWINGS

For a more complete understanding of the present invention and the advantages thereof, reference is now made to the following description taken in conjunction with the accompanying Drawings in which:

FIG. 7 illustrates a more detailed schematic diagram of the signal preconditioning device of the present invention.

DETAILED DESCRIPTION OF THE INVENTION

Figure 1:
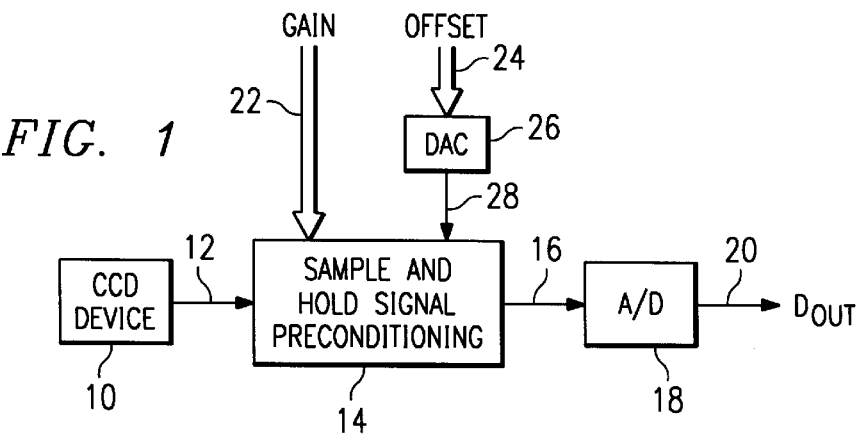
FIG. 1 illustrates a block diagram of a general signal processing system for a CCD device.

Referring now to FIG. 1, there is illustrated a block diagram of the system of the present invention for processing analog signals output by a CCD device 10 on an analog line 12. The CCD analog signal is input to a sample and hold signal preconditioning circuit 14 which provides a sampled differential signal on output 16 for input to an analog-to-digital converter 18, the output of which is a digital output on a line 20. The sample and hold signal preconditioning circuit 14 provides both correlated double sampling (CDS) and a programmable gain function. The programmable gain function is provided on a bus 22 and a programmable DC offset is also provided on a bus 24. The offset signal is input to a digital-to-analog converter (DAC) 26 to provide an analog offset signal on a line 20 to the preconditioning circuit 14, as will be described hereinbelow.

Figure 2:
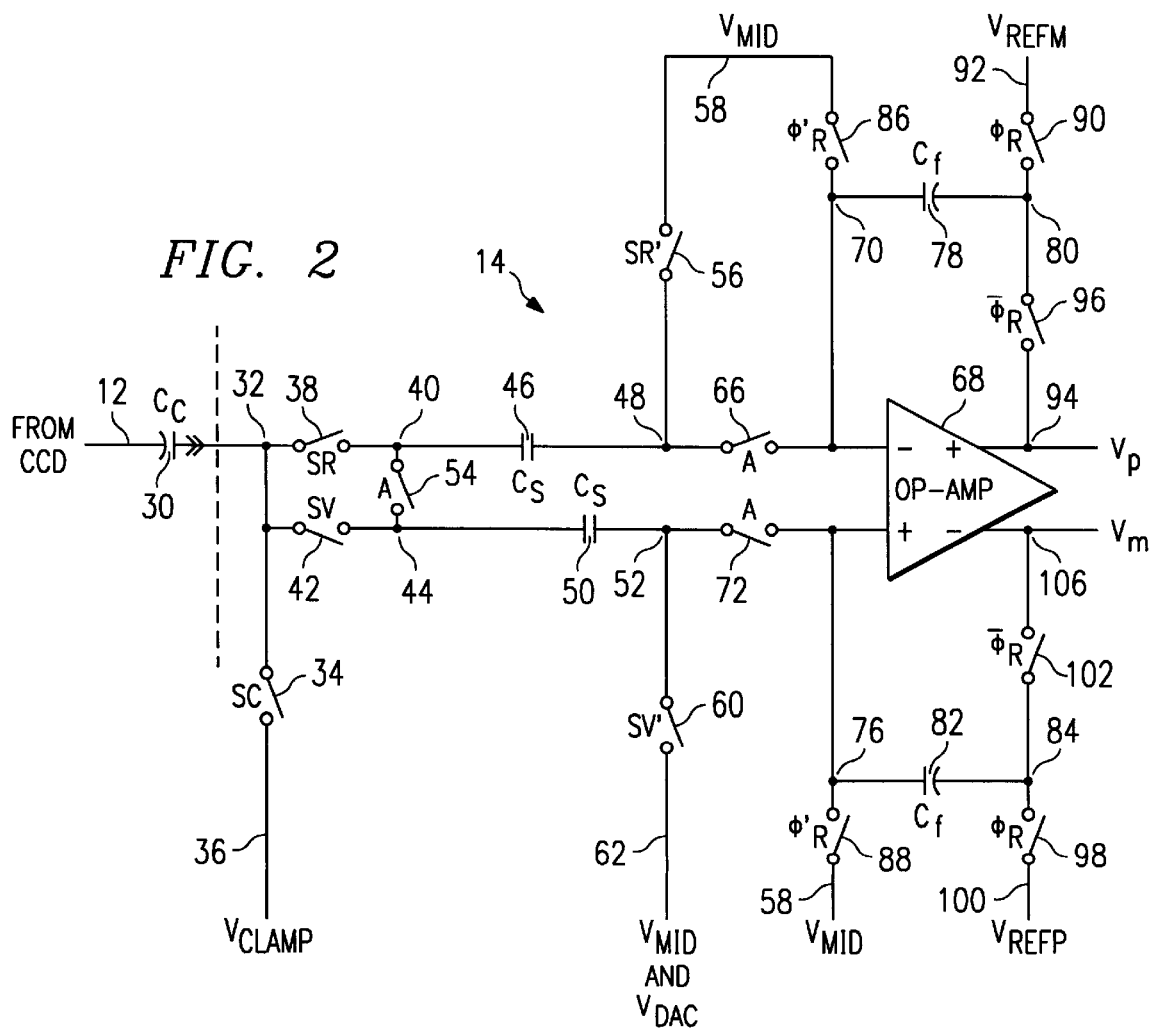
FIG. 2 illustrates a schematic diagram of the signal preconditioning device of the present invention.

Referring now to FIG. 2, there is illustrated a schematic diagram of the preconditioning circuit 14. The input on analog line 12 is coupled to the input of the preconditioning circuit 14 with a coupling capacitor 30 labeled $C_c$. This is input to a node 32. Node 32 is connected through a switch 34 to a voltage $V_{CLAMP}$ on a node 36. The switch 34 is controlled by timing signal SC. Node 32 is also input to one side of a switch 38, the other side of which is connected to a node 40. Node 32 is also connected to one side of a switch 42, the other side of which is connected to a node 44. Switch 38 is controlled by timing signal SR, and switch 42 is controlled by timing signal SV.

Node 40 is connected to one side of a sampling capacitor 46 labeled $C_s$, the other side of capacitor 46 is connected to a node 48. Similarly, node 44 is connected to one side of a sampling capacitor 50 labeled $C_s$, and the other side of capacitor 50 is connected to a node 52. An equalization switch 54 is connected between nodes 40 and 44 and is activated by a timing signal A.

Node 48 is connected through a switch 56 to a mid-point voltage $V_{MID}$ on a node 58. Switch 56 is controlled by a timing signal SR'. Node 52 is connected through a switch 60 to a voltage on a node 62 that is at the voltage $V_{MID}$ offset by an input DAC voltage $V_{DAC}$. Node 48 is connected through a switch 66 to the negative input of an operational amplifier 68 on a node 70. The switch 66 is controlled by the timing signal A. Node 52 is connected through a switch 72 to a node 76 on the positive input of the operational amplifier 68. Node 70 is connected to one side of a feedback capacitor 78, the other side thereof connected to a node 80, capacitor 78 labeled $C_f$. Node 76 is also connected to one side of a feedback capacitor 82, the other side thereof connected to a node 84, capacitor 82 labeled $C_f$.

Node 70 is connected through a switch 86 to the node 58 and the voltage $V_{MID}$, switch 86 controlled by the timing signal $\phi_R'$. Node 76 is also connected through a switch 88 to the node 58 and the voltage $V_{MID}$, switch 88 controlled by the timing signal $\phi_R'$. Node 80 is connected through a switch 90 to a node 92 which has a voltage of $V_{REFM}$, switch 90 controlled by a timing signal $\phi_R$. Node 80 is also connected to the positive output of the operational amplifier 68 on a node 94 through a switch 96, switch 96 controlled by the timing signal $\phi_R$-Bar. Node 84 is connected through a switch 98 to a node 100 having a voltage $V_{REFP}$, switch 98 controlled by the timing signal $\phi_R$. Node 84 is also connected through a switch 102 to the negative output of the operational amplifier 68 on a node 106. The positive output of operational amplifier 68 on node 94 is labeled $V_P$, and the negative output of the operational amplifier 68 on node 106 is labeled $V_M$. The voltage $V_{REFM}$ and $V_{REFP}$ indicate the negative and positive reference voltages at the negative and positive limits of the output. The difference between these two is the maximum voltage swing on the operational amplifier 68.

Figure 3:
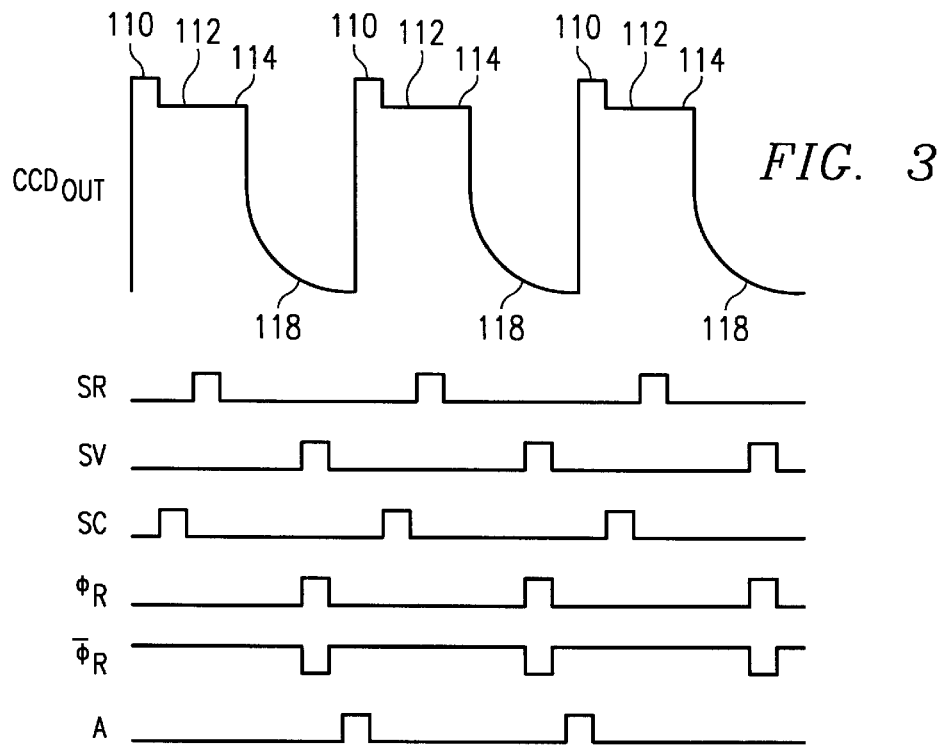
FIG. 3 illustrates a timing diagram for the preconditioning circuit.

Referring now to FIG. 3, there is illustrated a timing diagram depicting the operation of the preconditioning circuit 14 in FIG. 2. An output waveform of the CCD is represented by waveform $CCD_{OUT}$. The signal is comprised of timing information with pulses 110 which occur at a periodic rate. The timing pulses 110 rise from a DC level, and they return to the DC level on a "shelf" 112. This constitutes the DC level of the CCD signal for a given pixel, one associated with each timing pulse 110. However, it should be understood that this is an AC-coupled signal and, therefore, the average DC voltage can vary with noise, DC offset and drift. Once at the end of the shelf 112 at a point 114 and prior to the next clock signal 110, the video level for the associated pixel is represented by a value 118. Typically, each pixel will be represented by a single value that is generated after the DC level for that pixel. The difference between the DC level of the shelf 112 and the video signal level at point 118 represents the video output for that pixel. In a correlated double sample system, the differential signal between the shelf voltage level 112 in the DC reference and the signal level at point 118 is determined for each pixel, such that noise will not affect the measured pixel level. Additionally, it can be seen that this is a single-ended input and the preconditioning circuit 14 of FIG. 2 will convert this to a differential output analog signal.

In operation, the input signal is coupled through the capacitor 30 from line 12 to the node 32. In the initial part of the operation, the voltage on node 32 at the shelf 112 is clamped to a known DC voltage with the switch 34 in response to a timing signal SC. It should be noted for purposes of discussion that all switching is done on the negative transition of the timing signal. Therefore, the switches noted hereinabove with respect to FIG. 2 are closed only for a short duration of time. Once the DC level on the shelf 112 is "clamped" to the voltage of $V_{CLAMP}$ on node 36, the reference voltage of 4.2 volts will be present and, therefore, the DC level is known. Thereafter, the voltage on the shelf 112 is sampled onto the node 40 by closing the switch 38, as represented by the timing signal SR. This will provide the reference voltage on the lower plate of capacitor 46. Once this voltage is sampled on node 40, it being noted that equalization switch 54 is open, then the voltage on node 32 is sampled onto the lower plate of capacitor 50 by closing switch 42 in the presence of the SV signal which occurs at the point 118.

Figure 3A:
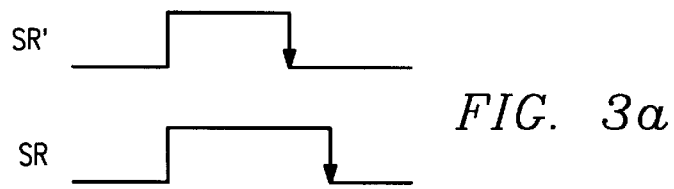
FIG. 3a illustrates an additional timing diagram illustrating the relationship between the SR' and SR.

When the switch 38 is closed by the timing signal SR, switch 56 on the other side of capacitor 46 is also closed to connect the node 48 to the voltage on node 58, $V_{MID}$. This is provided by the primed version of the timing signal SR, SR'. This is illustrated in FIG. 3A. In general, the primed version of the signal SR and the primed of the signal SV merely means that switch 56 opens prior to switch 38. The result is that the voltage across the capacitor 46 is the difference between the voltage $V_{MID}$ and the voltage on node 32 at the time that switch 38 and the switch 56 are closed. Similarly, when switch 42 is closed, switch 60 is closed with the primed version of the signal SV. This results in the voltage across capacitor 50 being the voltage $V_{MID}$+ $V_{DAC}$ and the voltage on node 32 at level 118.

At the time the video level is being sampled from node 32 corresponding to the level at point 118 on the timing diagram $CCD_{OUT}$, the feedback capacitors 78 and 82 are being precharged. They are precharged to a voltage wherein one side of each of the feedback capacitors 78 and 82 is connected to the mid-level voltage $V_{MID}$, the other plate of capacitor 78 is connected to $V_{REFM}$ on node 92, and the other plate of capacitor 82 is connected to $V_{REFM}$ on node 100. Therefore, when switches 86 and 90 are closed, the voltage across capacitor 78 is $V_{REFM}-V_{MID}$, and the voltage across capacitor 82 when switches 88 and 98 are closed is $V_{REFM}-V_{MID}$.

Once the switches 86 and 90, and 88 and 98, are open, then switches 96 and 102 are closed. Once the switches 96 and 102 are closed, the sampled values on nodes 48 and 52 will be connected to the negative and positive inputs of the operational amplifier 68. This is facilitated with the switches 66 and 72. At the same time, the lower plates of capacitors 46 and 50 on nodes 40 and 44, respectively, are connected together via the switch 54 controlled by the timing signal A. This will place the true differential voltage on nodes 48 and 58 and, subsequently, on the negative and positive inputs of the operational amplifier 68. The positive and negative outputs of the operational amplifier 68 will have a differential voltage disposed thereacross which is a function of the voltage on the input and the gain of the amplifier 68. The gain of the amplifier 68 is defined as the ratio of feedback capacitors 78 and 82 and the respective sampling capacitors 46 and 50. In general, since this is a differential amplifier, the sampling capacitors 46 and 50 are the same value, and the feedback capacitors 78 and 80 are the same value.

In the preconditioning circuit 14, it can be seen that through the use of the switches 38 and 42, a correlated double sampling operation is achieved in addition to converting a single-ended input into a differential output. Further, there is provided an offset by the voltage $V_{DAC}$ on the node 52. This offset will account for a DC offset in the "dark current" associated with the input. If, for example, the voltage at the signal level 118 were the same as that at the signal level on shelf 112, this would represent a dark pixel. If there is a DC offset, this will not be a true dark. By providing a DC offset, this will effectively compensate for any internal error with respect to dark current levels. This will effectively realize a real world condition.

To determine this DC offset, the CCD output signal is adjusted such that it outputs a dark current, i.e., the level for both the shelf 112 and the video signal level 118 are the same. This error is measured after processing by the preconditioning circuit such that any offset due to the operational amplifier 68 will be a part of the signal error. At the output, the analog voltage is converted to a digital code representing the analog voltage and a determination made as to the amount of offset required to adjust the signal level to a true "dark current" level. This is then stored in a register (not shown) which can then be output as a digital code to the DAC 26 for conversion into an analog voltage for input to the preconditioning circuit 14.

The differential output is provided by the fact that the two sampling capacitors 46 and 50 are equalized with the switch 54. This will result in the output voltages $V_P$ and $V_M$ on nodes 96 and 106 shifting by the same delta as the input but with a different polarity and level due the gain of the amplifier 68, hence a fully differential output is produced. The correlated double sampling is a result of the fact that the SR signal samples the reset signal in shelf 112, and the SV signal samples the video signal at a later time at the signal level 118. This provides a CDS operation.

The preconditioning circuit 14 also provides level shifting to maximize the internal voltage swing by mapping a zero input voltage to a negative internal voltage and by mapping a mid-point input to a zero level internal voltage the dynamic range will be −2 volts to +2 volts. By then mapping a maximum input to a maximum positive voltage, the following mapping operation will be performed wherein $V_R$ equals the reset voltage on the shelf 112, and $V_S$ equals the sampled video signal at the signal level 118:

| $V_R$–$V_S$ | $V_P$ | $V_M$ | $V_P$–$V_M$ | Comment |
|---|---|---|---|---|
| 0 | $V_{REFM}$ | $V_{REFP}$ | −($V_{REFP}$–$V_{REFM}$) | −(max swing) |
| (½)FS* | zero | zero | zero | zero |
| FS | $V_{REFP}$ | $V_{REFM}$ | $V_{REFP}$–$V_{REFM}$ | +(max swing) |

*FS = full scale input

To accomplished the above-noted mapping in FIG. 1, the two feedback capacitors 78 and 82 are precharged to $V_{REFM}$ and $V_{REFP}$, respectively.

Figure 4:
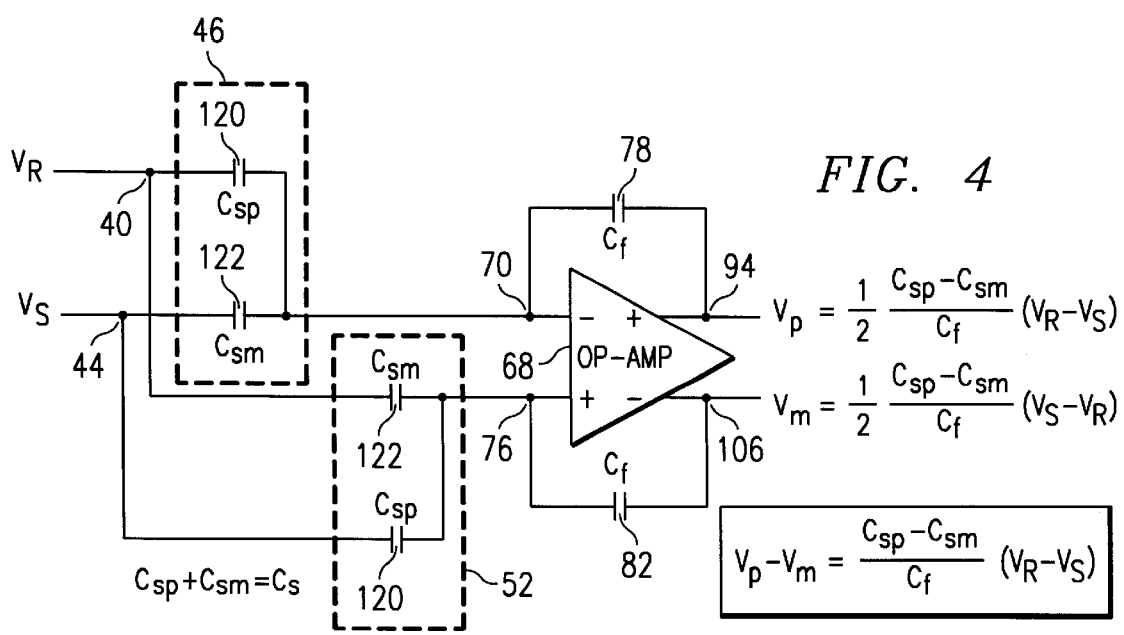
FIG. 4 illustrates a schematic diagram of the operational amplifier illustrating the programmable gain function.

Referring now to FIG. 4, there is illustrated a simplified schematic diagram for the programmable gain function. In FIG. 2 hereinabove, the sampling capacitors 46 and 50 were illustrated as single capacitors. However, to provide a programmable gain function, these capacitors are trimmed in value. The capacitor 46 is configured with two parallel connected capacitors, a positive sampling capacitor 120 and a negative sampling capacitor 122, the positive sampling capacitor 120 labeled $C_{SP}$ and negative sampling capacitor 122 labeled $C_{SM}$. The capacitor 52 is also comprised of the positive sampling capacitor 120 and the negative sampling capacitor 122, these being identical in value for both sampling capacitors 46 and 52. One side of each of the positive and negative sampling capacitors 120 and 122 for each of the sampling capacitors 46 and 52 are connected to the respective nodes 70 and 76. For the sampling capacitor 46, the other side of the positive sampling capacitor 120 is connected to the node 40 for the reset signal $V_R$ and the other side of the associated negative sampling capacitor 122 is connected to node 48 for the sampled video signal $V_S$. For the sampling capacitor 52, the other side of the associated negative sampling capacitor 122 is connected to the node 40, and the other side of the associated positive sampling capacitor 120 is connected to the node 44. The relationship of the output and the gain associated therewith is as follows:

$$V_P = \frac{1}{2} \frac{C_{SP} - C_{SM}}{C_F}(V_R - V_S) \quad (1)$$

$$V_M = \frac{1}{2} \frac{(C_{SP} - C_{SM})}{C_F}(V_S - V_R) \quad (2)$$

$$V_P - V_M = \frac{C_{SP} - C_{SM}}{C_F}(V_R - V_S) \quad (3)$$

It can be seen that by varying the value of both $C_{SM}$ and $C_{SP}$, the gain $(V_P-V_M)/(V_R-V_S)$ can be adjusted.

Figure 5:
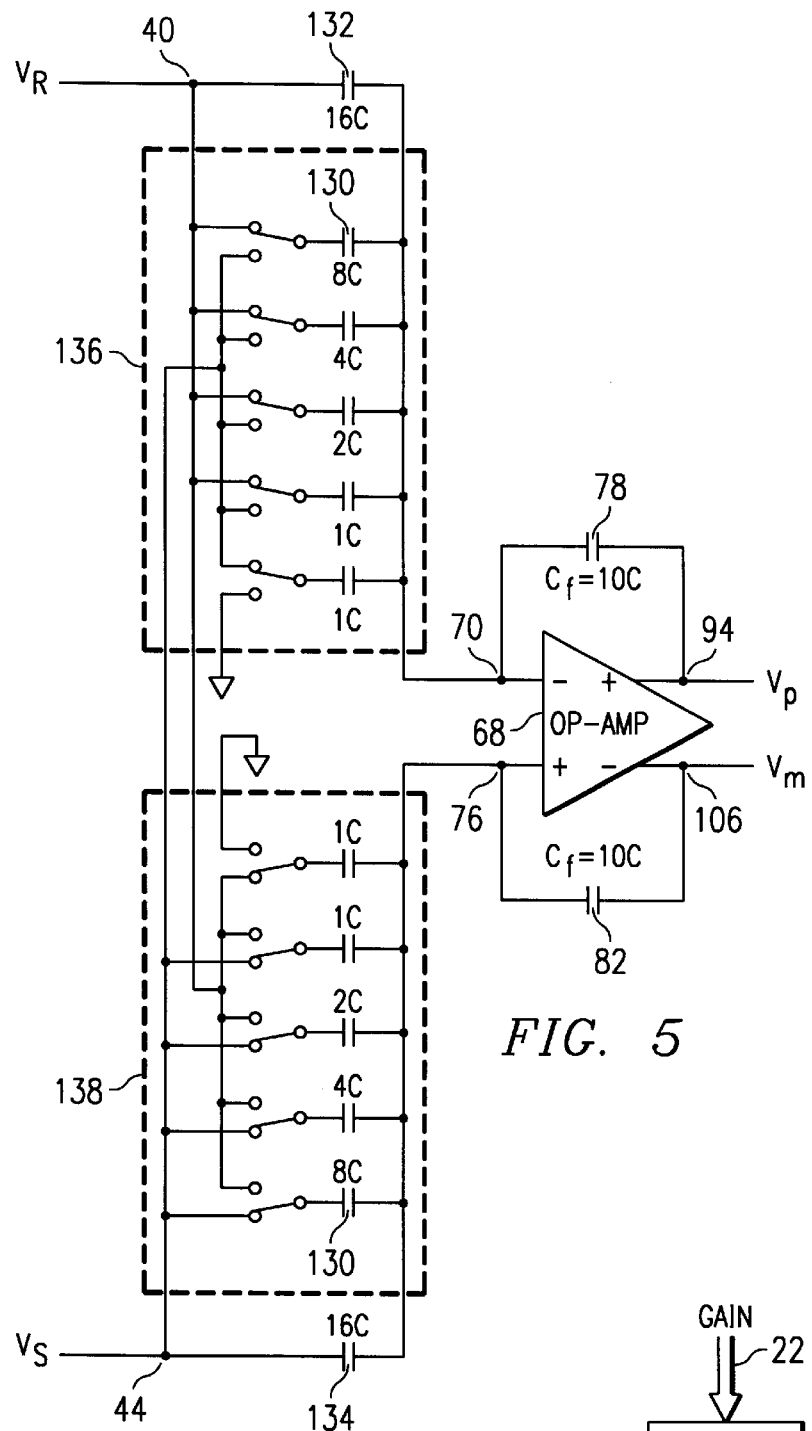
FIG. 5 illustrates a more detailed schematic diagram of the programmable gain amplifier of FIG. 4.

Referring now to FIG. 5, there is illustrated one embodiment of the programmable gain function of FIG. 4. The capacitors 120 and 122 are configured with a plurality of parallel capacitors 130, which can be selectively connected to form either capacitor $C_{SP}$ or $C_{SM}$. The capacitor $C_{SP}$ for each of the sampling capacitors 46 and 52 is comprised of a fixed capacitor value associated with a capacitor 132 connected between node 70 and node 40 and a capacitor 134 connected between node 76 and node 44. Capacitors 132 and 134 have a value 16C, whereas the feedback capacitors 70 and 82 have a value 10C. The trimming capacitors 130 are arranged in two banks, a first bank 136 associated with node 70, and a second bank 138 associated with node 76. The capacitors 130 in bank 136 are operable to have one plate thereof connected to node 70 and the other plate thereof selectable between node 44 and node 40. Initially, the value of $C_{SM}$ is maximum between node 70 and node 44 for the bank 136, and then it is incrementally changed such that the capacitors are selectively moved from node 44 to node 40. The capacitors 130 are comprised of five capacitors with values 8C, 4C, 2C, 1C and 1C, respectively. Initially, all capacitors 130 are connected together to provide a value of 16C for $C_{SM}$ and 16C for $C_{SP}$. The capacitance value can be changed such that the capacitor value of capacitor 132, $C_{SP}$, ranges from 16C to 31C, and the capacitance value of capacitor 134, $C_{SM}$, ranges from 15C to 0C. This is in accordance with the following Table 2:

TABLE 2

| $C_{SP}$ | $C_{SM}$ | $(V_P-V_M)/(V_R-V_S)$ | |
|---|---|---|---|
| 16 | 15 | 0.1 | * |
| 17 | 15 | 0.2 | |
| 17 | 14 | 0.3 | * |
| 18 | 14 | 0.4 | |
| . | | | |
| . | | | |
| . | | | |
| 29 | 3 | 2.6 | |
| 29 | 2 | 2.7 | * |
| 30 | 2 | 2.8 | |
| 31 | 2 | 2.9 | * |
| 31 | 1 | 3.0 | |
| 31 | 0 | 3.1 | * |

It can be seen that the input capacitance and the output capacitance of the amplifier are constant with the only problem being the feedback factor (f) at the trimmed values having an "*" associated therewith. This is due to the fact that there is no capacitor having a value of 0.5C.

Figure 6:
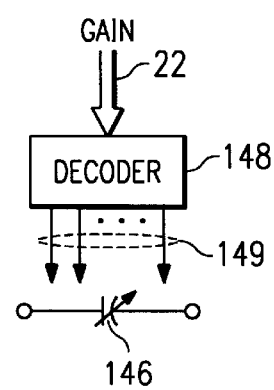
FIG. 6 illustrates a diagrammatic view of the variable capacitor and the input digital signal associated therewith.

Referring now to FIG. 6, there is illustrated a schematic diagram of a variable capacitor element 146 which is operable to provide the variable capacitance aspect for $C_{SP}$ and $C_{SM}$. A decoder 148 is operable to receive the gain signal on the bus 22 and convert it to one of n selection lines 149. This is a conventional operation that allows the capacitance value to be varied, as will be described hereinbelow.

Figure 7:
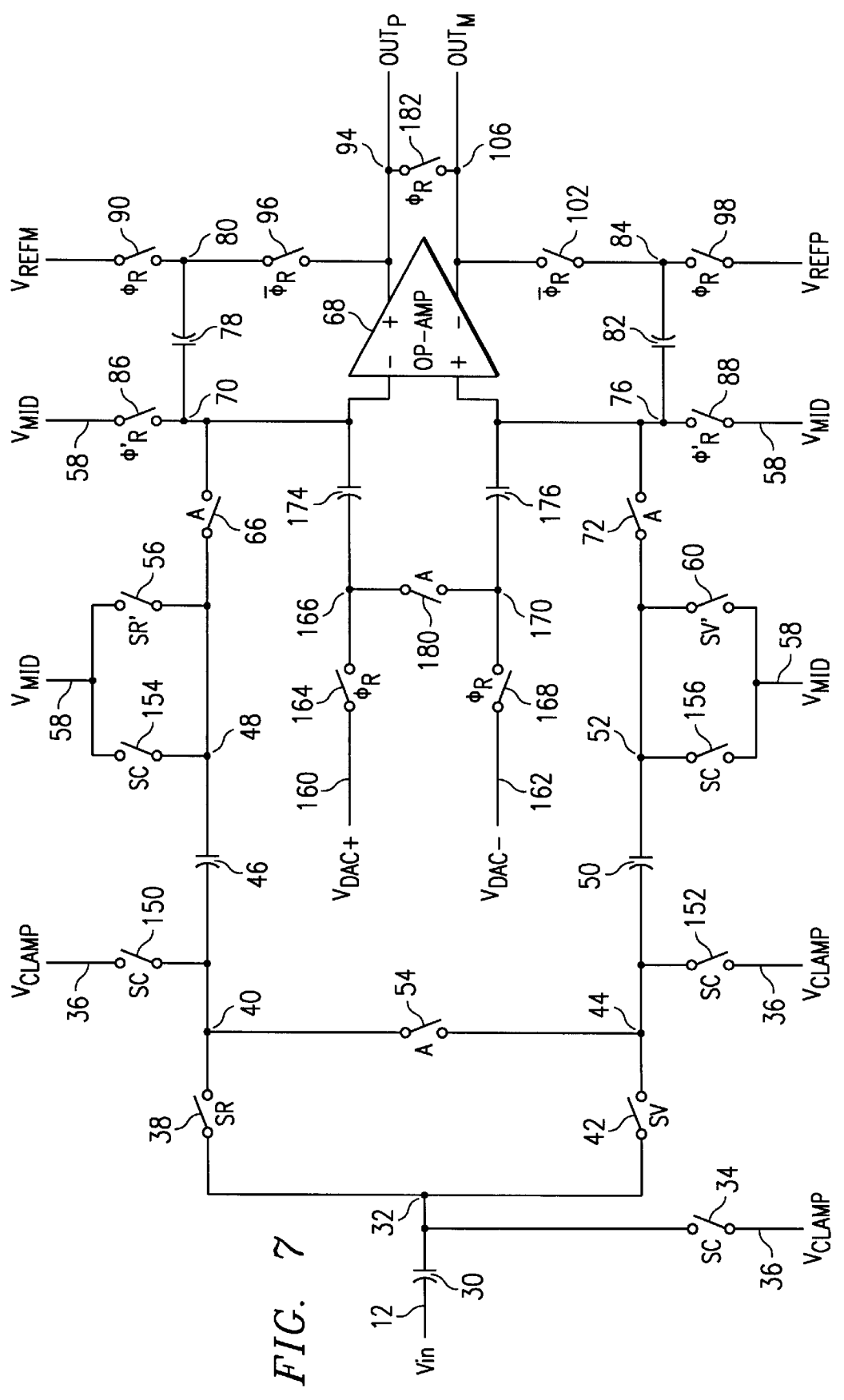

Referring now to FIG. 7, there is illustrated a schematic diagram of an alternate embodiment of the present invention. This embodiment is substantially similar to that of FIG. 2, with two exceptions: some additional switches associated with the signal A are provided, and the offset function is changed slightly. To remove any previous memory from a previous pixel for the next pixel operation, the node 40 and the node 44 are both clamped to the voltage $V_{CLAMP}$ on node 36 with switches 150 and 152, respectively. Additionally, the voltage on node 48 and the voltage on node 52 are clamped to the voltage $V_{MID}$ through switches 154 and 156, respectively, which switches 154 and 156 are controlled by the A timing signal. The switch 60 is connected between node 52 and the node 58 associated with the voltage $V_{MID}$. The DC offset function is provided by a positive voltage $V_{DAC+}$ and a negative voltage $V_{DAC-}$ on nodes 160 and 162, respectively. Node 160 is connected through a switch 164 to a node 166, and node 162 is connected through a switch 168 to a node 170. Node 166 is coupled to node 70 through a capacitor 174, and node 170 is coupled through a capacitor 176 to node 76. The switches 164 and 168 are controlled by the $\phi_R$ timing signal such that during the time the $\phi_R$ signal is active, switches 164 and 168 will close to sample the voltages $V_{DAC+}$ and $V_{DAC-}$ onto the plates of the capacitors 174 and 176, respectively. They will then be equalized with a switch 180 connected between nodes 166 and 170 and controlled by the timing signal A to apply the offset voltage $V_{DAC+}$- and $V_{DAC-}$ across the positive and negative inputs of the operational amplifier 68. There is also provided a switch 182, which is connected between nodes 94 and 106, which is controlled by the $\phi_R$ signal. This switch 182 will effectively equalize the two differential outputs whenever switches 96 and 102 are open to prevent an unknown condition on the output of the operational amplifier 68.

Figure 8:
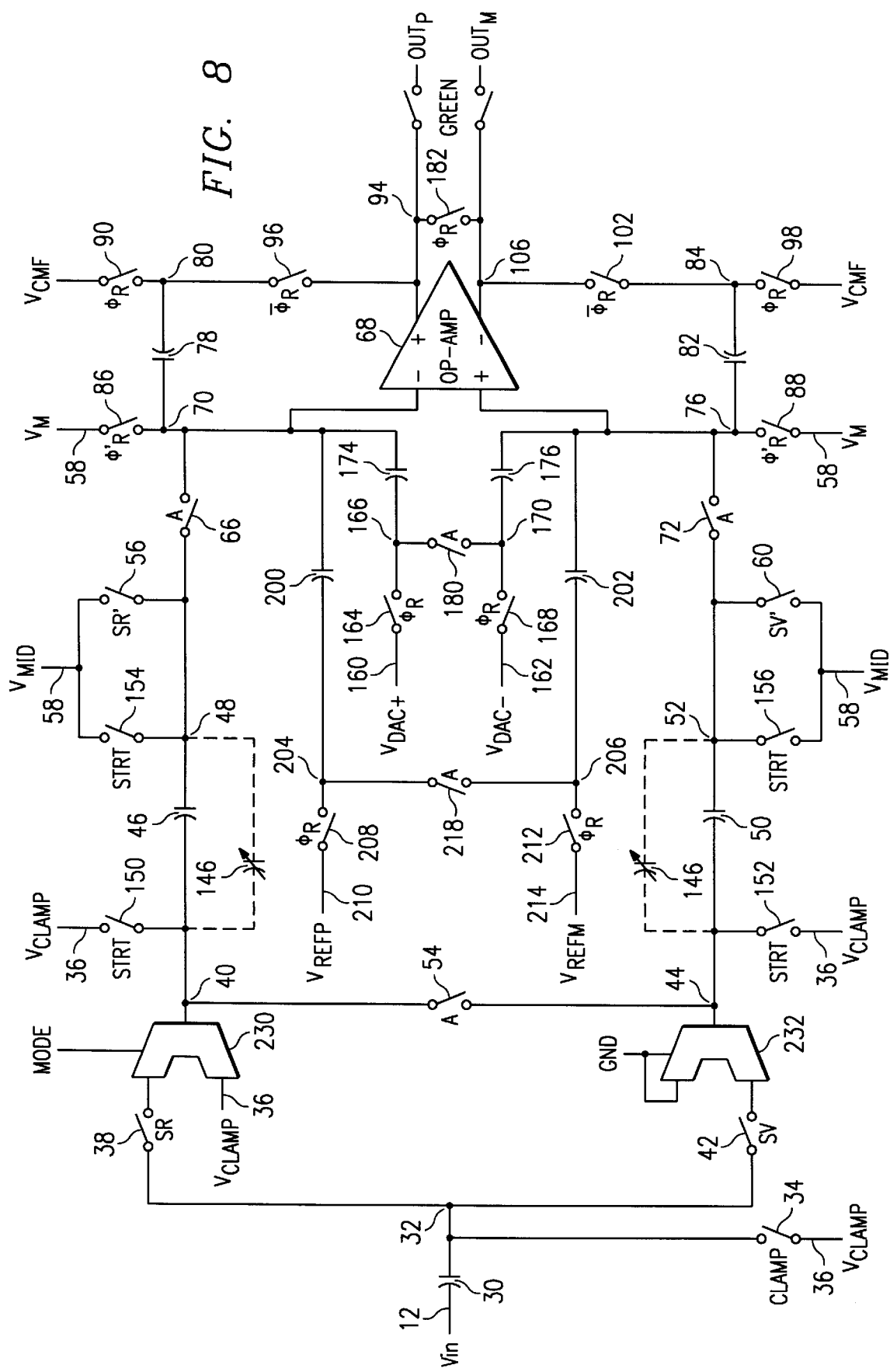
FIG. 8 illustrates a detailed description of an alternate embodiment of the signal conditioning element of the present invention.

Referring now to FIG. 8, there is illustrated an alternate embodiment to the embodiment of FIG. 7, wherein like numerals refer to like parts in the various figures. The negative and positive inputs on nodes 70 and 76 of the operational amplifier 68 are provided with two sampling capacitors 200 and 202, which sampling capacitor 200 is connected between node 70 and a node 204, and sampling capacitor 202 is connected between the node 76 and a node 206. Node 204 is connected through a switch 208 to a node 210 having the reference voltage $V_{REFP}$ disposed thereon. Node 206 is connected through a switch 212 to a node 214, having the voltage $V_{REFM}$ disposed thereon. Switches 208 and 212 are controlled by the timing signal $\phi_R$ and are therefore operable to sample the $V_{REFP}$ and $V_{REFM}$ signals onto the capacitors 200 and 202 during this period of time. Thereafter, nodes 206 and 204 are equalized with a switch 218 controlled by the A timing signal. When switches 86 and 208 are closed, the voltage across capacitor 200 will be $V_{REFP}-V_{MID}$ and when switches 212 and 88 are closed, the voltage across capacitor will be $V_{MID}-V_{REFM}$. When switches 86, 88, 208 and 212 are opened and switch 218 is closed, the voltage across node 70 and node 76 will be $V_{REFP}-V_{REFM}$. Similarly the contribution of the 174 and 176 will be $V_{DAC+}-V_{DAC-}$, which will provide a differential offset.

To provide for single-ended operation, the other side of switch 38, which was previously connected to node 40, is now connected to one end of input of the multiplexer 230, the other input thereof connected to the $V_{CLAMP}$ signal on node 36. A similar multiplexer 232 is provided which has one input connected to the other side of the switch 32 and the other input thereof connected to ground. In single-ended operation, multiplexer 230 will select the $V_{CLAMP}$ input, whereas the multiplexer 232 will always select the switch 42. The multiplexer 232 is provided to equalize the two circuits and has both the mode input and the other input thereof connected to ground. It will therefore only select the output of switch 42. The multiplexer 230, however, can select either the $V_{CLAMP}$ voltage on node 36 or the output of switch 38. For single-ended operation, the multiplexer 230 is configured to select the $V_{CLAMP}$ signal on node 36. This will result in the reference DC level $V_{CLAMP}$ always being on node 40 during the sampling operation.

Although the preferred embodiment has been described in detail, it should be understood that various changes, substitutions and alterations can be made therein without departing from the spirit and scope of the invention as defined by the appended claims.

What is claimed is:

1. A preconditioning circuit for preconditioning an analog CCD output signal representing the output of a plurality of pixels, each pixel having associated therewith a DC reference level and a video level, comprising:

a differential amplifier having positive and negative differential inputs and positive and negative differential outputs;

a sampling network for sampling the CCD output signal onto the input of said amplifier to provide a sampled analog output signal from said amplifier; and an offset network for generating a predetermined analog offset signal level and offsetting the sampled input signal to the input of said amplifier by the predetermined analog offset signal level such that any error due to dark current errors in the CCD output signal and any offset errors in said amplifier are compensated for by said predetermined analog offset signal level;

wherein said sampling network comprises first and second input sampling capacitors connectable on one side thereof to opposite ones of the positive and negative differential inputs of said amplifier, with the other end of each of said first and second sampling capacitors switchably connectable to the CCD output signal at different times, with the other side of said first sampling capacitor connected to the CCD output signal within a given pixel during the time said DC reference level is present to sample said DC reference level onto said first sampling capacitor, and the other side of said second sampling capacitor selectively connected to the CCD output signal during the time the video level of said given pixel is present to sample the video level onto said second sampling capacitor, and further comprising an equalization circuit for connecting the other sides of said first and second sampling capacitors together after sampling such that the absolute video level for a given pixel is determinable as the difference between the associated video level and DC reference levels for said given pixel.

2. The circuit of claim 1 wherein said sampling network operates with a correlated double sampling algorithm.

3. The circuit of claim 1 wherein said network comprises a summation for summing said predetermined analog offset signal to either of the positive or negative inputs.

4. The circuit of claim 3 wherein said summing network comprises first and second offset sampling capacitors each having one side thereof connected to a respective one of said positive and negative inputs of said amplifier, and the other side thereof connected through respective reset switches to the positive and negative polarities of a differential offset voltage, respectively, and wherein the other plates of said first and second offset capacitors are connected to the differential offset voltage prior to equalizing the other side of said first and second sampling capacitors.

5. The circuit of claim 1 and further comprising a DC clamping network for clamping the DC reference levels during generation thereof for each pixel to a predetermined DC clamp voltage prior to sampling the DC reference level onto the other side of said first sampling capacitor.

6. The circuit of claim 1 and further comprising shifting circuitry for shifting the differential output by a predetermined differential voltage level.

7. The circuit of claim 1 wherein said amplifier includes a feedback capacitor and an input sampling capacitor, which input sampling capacitor and feedback capacitor are part of said sampling network and further comprising a programmable element associated with said input sampling capacitor for varying the value thereof to change the gain associated with said amplifier to provide a programmable gain amplifier.

8. A method for preconditioning an analog CCD output signal which represents the output of a plurality of pixels, each pixel having associated therewith a DC reference level and a video level, comprising the steps of:

providing a differential amplifier having a positive and a negative differential input and a positive and a negative differential output;

sampling the CCD output signal onto the input of the amplifier to provide a sampled analog output signal from the amplifier; and generating a predetermined analog offset signal level and offsetting the sampled input signal to the input of the amplifier by the predetermined analog offset signal level such that any error due to dark current errors in the CCD output signal and any offset errors in the amplifier are compensated for by the predetermined analog offset signal level;

wherein the step of sampling comprises the steps of:

providing first and second input sampling capacitors connectable on one side thereof to opposite ones of the positive and negative differential inputs of the amplifier, with the other end of each of the first and second sampling capacitors switchably connectable to the CCD output signal at different times, with the other side of the first sampling capacitor connected to the CCD output signal in a given pixel during the time the DC reference level is present to sample the DC reference level onto the first sampling capacitor, and the other side of the second sampling capacitor selectively connected to the CCD output signal during the time the video level of the given pixel is present to sample the video level onto the second sampling capacitor; and connecting the other sides of the first and second sampling capacitors together after sampling such that the opposite video level for a given pixel is determinable as the difference between the associated video level and the DC reference levels for the given pixel.

9. The method of claim 8, wherein the step of sampling the CCD output signal operates with a correlated double sample algorithm.

10. The method of claim 8, wherein the step of sampling includes summing the predetermined analog offset signal to either of the positive or negative inputs.

11. The method of claim 10, wherein the step of summing comprises the steps of providing first and second offset sampling capacitors, each having one side thereof connected to a respective one of the positive and negative inputs of the amplifier, and the other side thereof connected through respective reset switches to the positive and negative polarities of a differential offset voltage, respectively, and wherein the other plates of the first and second offset capacitors are connected to the differential offset voltage prior to equalizing the other side of the first and second sampling capacitors.

12. The method of claim 8 and further comprising the step of clamping the DC reference levels during generation thereof for each pixel to a predetermined DC clamp voltage prior to sampling the DC reference level onto the other side of the first sampling capacitor.

13. The method of claim 8 and further comprising the step of shifting the differential output by a predetermined differential voltage level.

14. The method of claim 8, wherein the step of providing the amplifier comprises providing an amplifier with a feedback capacitor and an input sampling capacitor, which input sampling capacitor and feedback capacitor are part of the sampling network and further comprising the step of associating a programmable element with the input sampling capacitor and varying the value of the programmable element to change the gain associated with the amplifier to provide a programmable gain amplifier.

* * * * *